United States Patent [19]

Smith

[11] 4,363,313

[45] Dec. 14, 1982

[54] PORTABLE CAMPFIRE FIREPLACE

[76] Inventor: Robert J. Smith, 58444 S.R. 15, Goshen, Ind. 46526

[21] Appl. No.: 209,522

[22] Filed: Nov. 24, 1980

[51] Int. Cl.³ .................. F24C 15/00; A47J 37/00
[52] U.S. Cl. .......................... 126/9 R; 126/25 AA; 126/30
[58] Field of Search .................. 126/25 R, 9 R, 9 A, 126/9 B, 25 A, 25 AA, 25 B, 25 C, 29, 59, 30

[56] References Cited

U.S. PATENT DOCUMENTS

| | | | |
|---|---|---|---|
| 1,192,315 | 7/1916 | Hughes | 126/9 R |
| 1,423,612 | 7/1922 | Jewett | 126/30 |
| 1,452,640 | 4/1923 | Hulick | 126/30 |
| 3,667,446 | 6/1972 | Morton | 126/25 C |

Primary Examiner—James C. Yeung
Attorney, Agent, or Firm—Marmaduke A. Hobbs

[57] ABSTRACT

A portable campfire fireplace for containing a campfire and for providing a cooking surface which is adjustable with respect to the fire, in which side walls form a firebox and are hinged to fold flat, side by side. A post extends upwardly from eyes at one corner of the firebox and a bracket for holding a grill is slidable and rotatable on the post. A collar and set screw hold the bracket in place on the post. All pieces of the fireplace can be attached to one wall of the firebox for storing and transporting the fireplace. A false bottom may be disposed in the firebox for charcoal cooking, to hold the charcoal near the top of the firebox.

8 Claims, 5 Drawing Figures

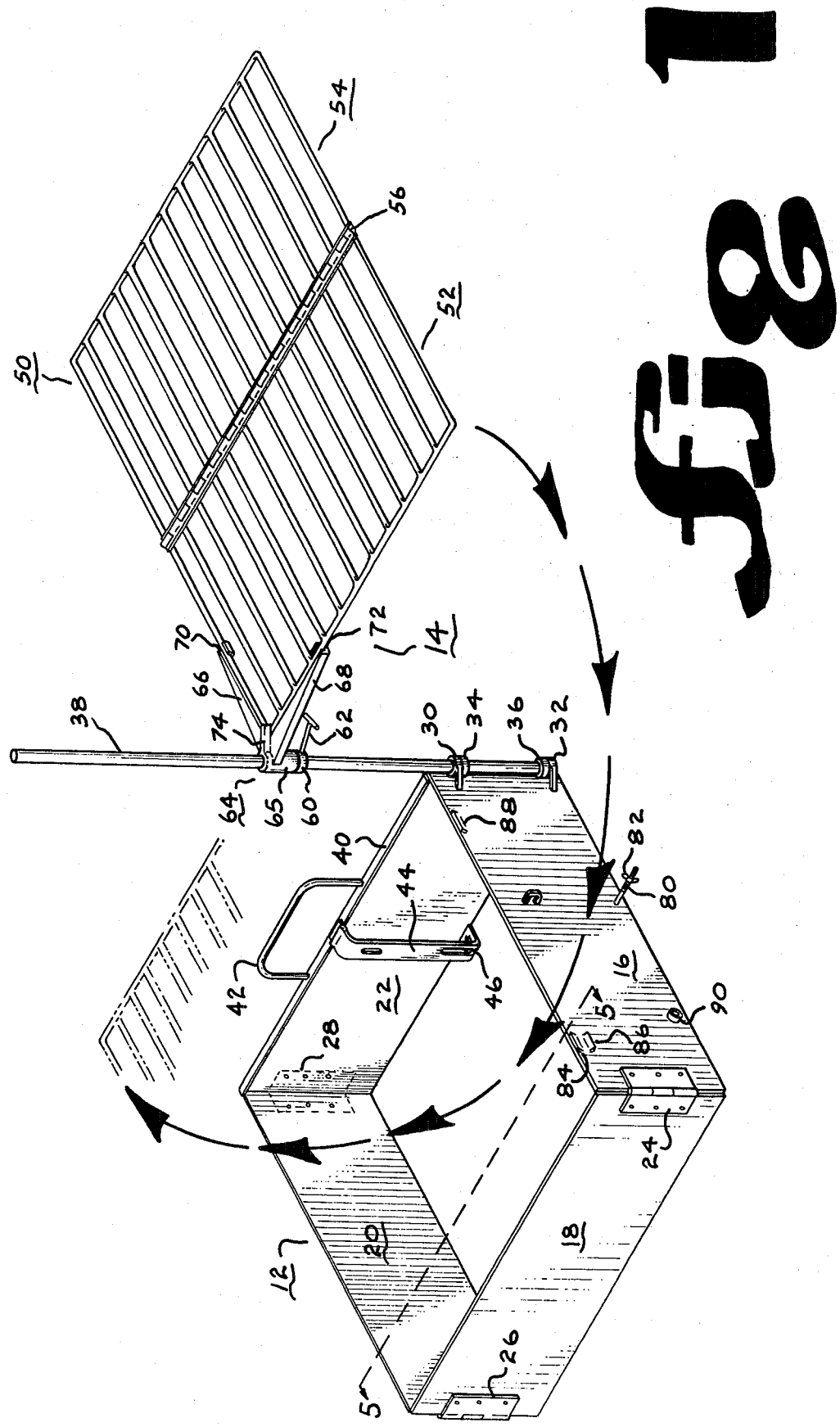

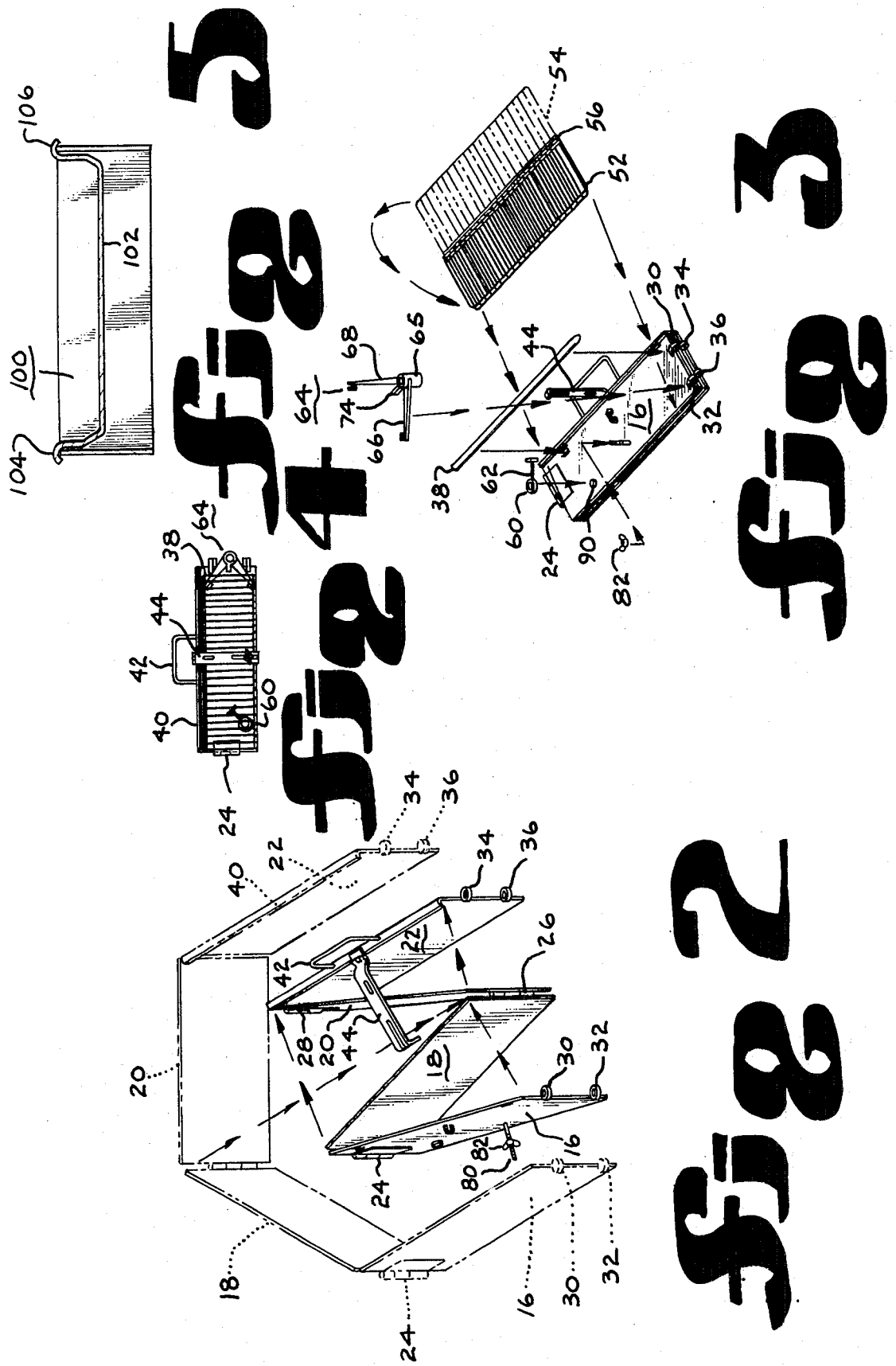

PORTABLE CAMPFIRE FIREPLACE

BACKGROUND OF THE INVENTION

Camping has been, and remains, a popular form of outdoor recreation for individuals and families. One day excursions for picnics, fishing trips or sightseeing, as well as multi-day vacation trips, frequently require the preparation of at least one meal out-of-doors. Although the more modern camping equipment such as trailers, pop-up tents and the like frequently have built in gas stoves, a substantial number of campers, hikers and backpackers prefer to cook their meals over an open campfire while camping. The campfire provides a source of heat to warm the campers, and often becomes the focal point of campsite activity. For many outdoor enthusiasts, the open campfire creates the atmosphere which attracts them to camping for recreation.

Publicly owned and privately owned campgrounds frequently provide fireplaces in which a campfire can be built, and the fireplace normally has a grill on which cooking utensils can be placed during the preparation of a meal. While the typical outdoor fireplace provides a suitable location and device in which to build a fire, the fireplace often is less than ideally suited for the preparation of a meal. Normally, the grills are attached permanently to the walls of the firebox, and although the grill may be hinged along one edge to facilitate the addition of wood and the removal of ashes, normally the grill is not adjustable to various cooking heights. It is desirable in cooking over an open fire to move the cooking pans in relation to the fire, either vertically to move the pans closer to or further from the fire directly thereunder, or horizontally to move the pans away from the fire to keep warm. The heat from a campfire is relatively difficult to control, and the intensity of heat from the fire depends on the type of wood being used in the fire, the moisture in the wood, and the skill of the camper in controlling the fire. Moving the pans relative to the fire compensates for variations in heat from the fire.

Even in those camping facilities in which campfire fireplaces are provided, it is not uncommon that some campsites will share a single fireplace, thus making it inconvenient for the campers at the two sites to prepare meals simultaneously. Especially in public campgrounds, the fireplace may fall into a state of disrepair, making the use thereof difficult, if not entirely impossible. Some camping facilities, such as beaches where open campfires are permitted, have no specific locations for fires. Likewise, the wilderness camper or hiker will not normally have outdoor fireplaces at his disposal. Thus, many outdoor enthusiasts carry apparatus for cooking over open fires built on the ground. In many instances this apparatus consists only of a grill with legs to hold the cooking area of the grill above the campfire. These devices provide little, if any, adjustability of the cooking surface in relation to the campfire. Most of these devices also do not provide any type of containment for the fire itself but are merely a grill with supporting structure to hold the grill above the fire; thus, the wind can blow ashes from the fire and make controlling the fire more difficult. Since packing space is normally at a premium for campers, backpackers and the like, prior to this time it has been impractical to carry an enclosed campfire fireplace to the campsite.

SUMMARY OF THE INVENTION

It is therefore one of the principal objects of the present invention to provide a portable campfire fireplace which can be carried from campsite to campsite to provide an enclosed area for building a campfire with a cooking surface that is adjustable relative to the campfire, and which can be stored in a minimal amount of space when not in use.

These and other objects are accomplished in the present invention by providing a firebox having walls defining an enclosed area in which the campfire may be built, the walls being hinged at their corners to permit the walls to be closed to a flattened position side by side, requiring only minimal storage space. A post extends upwardly from the opened structure, and has a bracket extending outwardly therefrom for supporting a grill on which cooking pans may be placed. The bracket is vertically adjustable on the post, thereby premitting the cooking utensils to be lowered closer to or raised farther from the fire. The bracket is also rotatable on the post, to permit the grill with cooking utensils thereon to be rotated away from the fire.

Another object of the present invention is to provide a portable campfire fireplace which folds substantially flat and requires only a minimal amount of storage space, and which has a compact closed arrangement wherein all pieces of the portable fireplace are secured to the flatly folded walls, minimizing the possibility of misplacing pieces when the fireplace is not in use.

A further object of the present invention is to provide a portable campfire fireplace which may be used with wood or charcoal to provide campfire cooking or charcoal cooking, respectively, and which can be used to keep foods warm as well as to cook foods.

Additional objects and advantages of the present invention will become apparent from the following detailed description and the accompanying drawings.

BRIEF DESCRIPTION OF THE DRAWINGS

FIG. 1 is a perspective view of a portable campfire fireplace embodying the present invention, with the movement of various parts of the fireplace shown by arrows and phantom lines;

FIG. 2 is a perspective view showing the procedure whereby the fireplace walls are folded from the opened position to the closed position;

FIG. 3 is an exploded view showing the closed assembly of the fireplace;

FIG. 4 is a plan view of the completely closed fireplace; and

FIG. 5 is a vertical cross sectional view of a modified form of the invention, taken on line 5—5 of FIG. 1.

DETAILED DESCRIPTION OF THE PREFERRED EMBODIMENT

Referring now more specifically to the drawings, and to FIG. 1 in particular, numeral 10 designates a portable campfire fireplace embodying the present invention having a firebox 12 and an adjustable cooking unit 14. Normally fireplace 10 will be made of metal having sufficient heat resistance to withstand the heat from a campfire without becoming deformed or weakened by repeated heating and cooling. The fireplace may be of any size suitable for holding firewood, and a pit for an individual camper or backpacker will probably be smaller than one to be used by a large group or family requiring a larger cooking area for more and larger cooking utensils.

Firebox 12 includes side walls 16, 18, 20 and 22 which, when fully opened, define a square inner area in which the campfire can be built. A hinge 24 is disposed at the adjacent end edges of side walls 16 and 18 and permits walls 16 and 18 to move with respect to each other so that the inner surfaces of the side walls can be folded against each other. A hinge 26 is disposed at the adjacent edges of side walls 18 and 20 and permits walls 18 and 20 to move with respect to each other so that the outer surfaces of the walls can be folded against each other. A hinge 28 is disposed at the adjacent edges of side walls 20 and 22 and permits walls 20 and 22 to move with respect to each other so that the inner surfaces of the walls can be folded against each other. The movement of the walls with respect to each other as just described occurs when the corner formed by walls 18 and 20 is moved toward the nonhinged corner formed by walls 16 and 22. Eyes 30 and 32 are disposed near the edge of side wall 16 opposite the edge connected to hinge 24, and when the firebox is fully opened, the eyes are aligned above and below a pair of eyes 34 and 36, respectively, disposed near the edge of side wall 22. A post 38 is disposed in eyes 30, 32, 34 and 36 and extends upwardly therefrom. When disposed in the eyes, the post secures the walls of the firebox in the opened position, and when the post is removed from the eyes the walls can be folded flat. Side wall 22 includes an inwardly extending flange 40 at the upper edge of the side wall and a handle 42 disposed on the flange. A hasp 44 having a slot 46 at the free end is attached to the flange and folds downwardly over the flatly folded side walls.

Cooking unit 14 includes a grill 50 having two grill sections 52 and 54 connected by a hinge 56. In the embodiment shown, a piano hinge is disposed between grill sections 52 and 54; however, any pivotal attachment may be used which permits the upper surfaces as shown in FIG. 1 to be folded against each other, but which also restricts movement of the grill sections beyond the flattened position in the opposite direction. In some embodiments grill 50 may be one solid piece, not having the hinged sections; however, for compact carrying and storing of the fireplace, the hinged grill is peferred, since it permits the grill to be folded to substantially the size of the side walls. A collar 60 having a T-shaped set screw 62 is disposed on post 38, and may be slid upwardly or downwardly on the post and secured in any location on the post by tightening set screw 62 against the post. A bracket 64 slides along the post and rests on top of collar 60, and includes a sleeve 65 and radially extending arms 66 and 68 with channel-like portions 70 and 72 at the ends thereof into which the edge pieces from the grill may be inserted. A stop bar 74 extends inwardly from the corner formed where the arms of bracket 64 join, and extends over the corner of grill 50 when the edges of the grill are inserted in channels 70 and 72. Hence, the grill is held in a substantially horizontal position by bracket 64 and will support cooking utensils filled with food.

For securing all parts of the fireplace when disassembled to the flatly folded firebox, side wall 16 includes an outwardly extending bolt 80 having a wing nut 82, and also includes knob-like projections 84 and 86 for holding pole 38, and an annular knob 90 for holding collar 60. The placement and attachment of the loose parts of the fireplace on the flatly folded firebox will be explained more fully hereinafter.

In the use and operation of a portable campfire fireplace embodying the present invention, the firebox is unfolded and expanded to the open position and is secured in the open position by inserting post 38 through the aligned eyes 30, 32, 34 and 36. Collar 60 is placed on post 38 and is secured thereto by set screw 62, and bracket 64 is slid downwardly on the post to rest on top of collar 60. Grill 50 is attached to the bracket by angling one corner of the grill downwardly from a position above the bracket toward the corner formed by arms 66 and 68 of the bracket. The corner is placed under stop bar 74 and the diagonally opposite corner of the grill from the corner under the stop bar is lowered until the edges of the grill rest in channels 70 and 72. Since sleeve 65 of bracket 64 merely rests on top of collar 60, the bracket and grill may be rotated on post 38 at any time. Hence, the grill can be rotated to a position above the fire for cooking food, may be rotated partially off the fire so that some foods are directly above the fire and being cooked while others are not directly over the fire but are being kept warm by the fire, or the grill may be rotated on post 38 to a position where the entire grill is away from the fire, as shown in FIG. 1. Vertical movement of the grill is achieved by loosening set screw 62 and sliding collar 60 either upwardly or downwardly on post 38 and securing the collar in the desired position.

The present portable fireplace is also advantageous when used for campfires other than when meals are being prepared. Grill 50 and bracket 64 can be removed from the post when meals are not being prepared, and can be quickly replaced for cooking. Normally post 38 will be left in eyes 30, 32, 34 and 36 to secure the walls in the open, expanded position; however, the post may be removed if desired, or it may be replaced with a shorter and less interfering post. The side walls of the firebox minimize the effects from gusts of wind in disturbing the fire and blowing ashes away, while also containing the fire and minimizing the spreading out of the burning material which normally occurs as the burned pieces fall from a burning pile.

When the portable fireplace is to be disassembled, the corner of grill 50 farthest from post 38 is raised upwardly, hence lowering the opposite corner away from stop bar 74. The grill may then be lifted away from arms 66 and 68. Bracket 64 is slid off post 38, set screw 62 is loosened so that collar 60 may also be removed from the post, and the post is removed from eyes 30, 32, 34 and 36. With the post removed from the eyes, the edges of side walls 16 and 22 are moved apart from each other. The corner formed by side walls 18 and 20 is pulled inwardly toward the general location where post 38 was inserted into the eyes, and at the same time, the corners formed by the adjacent edges of the other side walls are closed so that the four side walls will be flat against each other in a side by side relationship throughout substantially the length of each. The procedure for folding the firebox is shown by the phantom lines and arrows in FIG. 2. During the folding procedure, hasp 44 is raised above the upper edge of side wall 22 so as not to interfere with the firebox side wall folding. When the side walls are flatly folded, walls 16 and 22 are on the outside of the folded firebox and walls 18 and 20 are disposed between side walls 16 and 22.

After the side walls have been folded, the firebox normally will be placed on its side, with side wall 16 being on top. In this position, the yet loose members of cooking unit 14 may be attached to the folded firebox.

Post 38 is placed on side wall 16 between projections 84 and 86 on one end, and between projection 88 and eye 30 on the other end. Bracket 64 is placed flat on side wall 16 with arm 66 thereof against eye 32 and arm 68 against post 38. Collar 60 is placed on knob 90, and set screw 62 is tightened against the knob to hold collar 60 in place. Grill 50 is folded and is placed on top of the aforementioned pieces now resting on side wall 16. Hasp 44 is folded over the top of grill 50, and bolt 80 extends through slot 46 of the hasp. Wing nut 82 is tightened against the hasp to hold the hasp and grill against side wall 16. In this storing arrangement, none of the parts of the fireplace are loose or can fall from the closed structure. Grill 50 holds bracket 64 against side wall 16, and the bracket is restricted from sliding outwardly from under the grill by eyes 30 and 32 which have a smaller opening therebetween than the distance between the outer edges of arms 66 and 68. The grill overlaps post 38 and collar 60, and the hasp holds the grill in place. In this closed and compact arrangement, the fireplace is easily carried by handle 42 and requires little storing and packing space.

In the modification shown in FIG. 5, a pan 100 is provided as a false bottom in the firebox for building charcoal fires. The pan will normally be required for cooking with charcoal briquettes, in that the side walls 16, 18, 20 and 22 are of a greater depth than desirable for charcoal cooking. If the charcoal were placed on the ground between the firebox side walls, the charcoal would be further from grill 50 than is desirable for charcoal cooking. Pan 100 includes a bottom 102 on which the charcoal is placed to bring the charcoal closer to the top of the side walls 16, 18, 20 and 22, and hooked portions 104 and 106 attach bottom 102 to side walls 16 and 20.

Although one embodiment of a portable campfire cooking pit and a modification thereof have been shown and described in detail herein, various other changes may be made without departing from the scope of the present invention.

I claim:

1. A portable campfire fireplace comprising a firebox including four walls, hinge means for interconnecting said walls at three corners to permit said walls to be moved between an open position in which the walls are disposed adjacent each other at their end edges to define a substantially enclosed inner area in which the fire may be built and a closed position in which said walls are compactly arranged for storage, releasable fastening means connecting the walls at the fourth corner including eyes disposed on each of said adjacent end edges of said walls at said fourth corner and overlapping each other when said firebox is in the open position, an elongated post removably inserted into said overlapping eyes to lock said eyes together and to hold said post in a vertical position on the firebox, a cooking unit mounted on said post and including a cooking surface on which meals can be prepared, and means for adjusting the position of said cooking surface vertically and horizontally with respect to said firebox.

2. A portable campfire fireplace as defined in claim 1 in which said inner area of said firebox defined by said walls is square.

3. A portable campfire fireplace as defined in claim 1 in which said walls are disposed side by side throughout substantially the length of each in the closed position.

4. A portable campfire fireplace as defined in claim 3 in which said cooking unit includes a bracket having a sleeve slidable on said post and rotatable with respect thereto, and a grill held by said bracket.

5. A portable campfire fireplace as defined in claim 4 in which a collar is slidably disposed on said post, means is provided for securing said collar in position on said post, and said bracket rests on said collar.

6. A portable campfire fireplace as defined in claim 4 in which said grill is hinged for folding to substantially the size of one of said side walls.

7. A portable campfire fireplace as defined in claim 5 in which means are provided for attaching said grill, said post, said bracket and said collar to said side walls when said side walls are disposed one on top of another.

8. A portable campfire fireplace as defined in claim 1 in which a false bottom is attached to said walls for holding charcoal briquettes.

* * * * *